United States Patent [19]

Ishikawa et al.

[11] Patent Number: 5,565,762
[45] Date of Patent: Oct. 15, 1996

[54] DC/DC CONVERTER AND AUDIO DEVICE INCORPORATING THE SAME

[75] Inventors: Hiroyuki Ishikawa; Sachito Horiuchi, both of Kyoto, Japan

[73] Assignee: Rohm Co., Ltd., Kyoto, Japan

[21] Appl. No.: 449,830

[22] Filed: May 24, 1995

[30] Foreign Application Priority Data

May 26, 1994 [JP] Japan ..................... 6-136277

[51] Int. Cl.⁶ ................. G05F 1/10; G05F 1/40
[52] U.S. Cl. ............................. 323/222; 323/282
[58] Field of Search .................... 323/222, 224, 323/282, 285, 288; 363/21, 23, 25

[56] References Cited

U.S. PATENT DOCUMENTS

| | | | |
|---|---|---|---|
| 4,644,458 | 2/1987 | Harafuji et al. | 363/65 |
| 4,845,605 | 7/1989 | Steigerwald | 363/21 |
| 4,903,181 | 2/1990 | Seidel | 363/16 |
| 5,384,518 | 1/1995 | Kido et al. | 315/225 |
| 5,440,223 | 8/1995 | Hayasaki | 323/282 |
| 5,479,088 | 12/1995 | Hayakawa et al. | 323/282 |
| 5,495,164 | 2/1996 | Heng | 323/222 |

FOREIGN PATENT DOCUMENTS

| | | |
|---|---|---|
| 5-82146 | 2/1989 | Japan . |
| 7-177792 | 7/1995 | Japan . |

Primary Examiner—Matthew V. Nguyen
Attorney, Agent, or Firm—Fay, Sharpe, Beall, Fagan, Minnich & McKee

[57] ABSTRACT

A DC/DC converter and an audio device incorporating the same performs a switching operation of a transistor through a driving control merely by an oscillation circuit under a light load condition other than a switching control circuit which shows a low conversion efficiency under a light load condition, thereby the conversion efficiency therewith under a light load condition is improved.

8 Claims, 5 Drawing Sheets

DC/DC CONVERTER AND AUDIO DEVICE INCORPORATING THE SAME

BACKGROUND OF THE INVENTION

1. Field of the Invention

The present invention relates to a DC/DC converter and an audio device incorporating the same, and, more specifically, relates to a DC/DC converter used in a battery driven portable audio device incorporating a DC motor such as a portable compact disk (CD) player and in a battery driven HDD device incorporating a motor driving circuit in which a heavy load condition such as for driving a DC motor and a light load condition for merely driving a microcontroller including a MPU generating simply control signals and an IC circuit such as a memory are separated and an efficient DC/DC conversion is performed.

2. Background Art

A conventional portable CD player incorporates a DC motor and its driving circuit for rotating a CD at a predetermined rotating speed other than an audio circuit for reproducing sounds recorded on the CD. In these days such a portable CD player is further provided with a control circuit including a microcontroller, ROM and others which, for example, sets conditions of a variety of the incorporated circuits and operates the same upon receipt of a variety of operating signals such as from a control panel.

The control circuit including a microcontroller, ROM and others is usually operated at a power source voltage of about 3~5 V and consums a little electric power, however the audio circuit is usually driver at a power source voltage of about 3.5 V and consumes a comparatively large electric power. Further, the motor driving circuit usually requires a driving voltage of about 8 V and consumes a large electric power together with the DC motor.

With regard to a driving voltage of the DC motor itself, a lower voltage is, for example, from about 1.2 V to 2.4 V which can be taken care of by one or two dry batteries, however the motor driving circuit for driving the DC motor requires a higher driving voltage. The reason therefor is that the output stage of the motor driving circuit incorporated in such potable device uses an N type MOS transistor having a high driving capacity in order to reduce the battery power consumption. For reducing the power consumption it is necessary to reduce the ON resistance of the N type MOS transistor, for which reason the gate voltage of the N type MOS transistor has to be raised.

Figure 5:
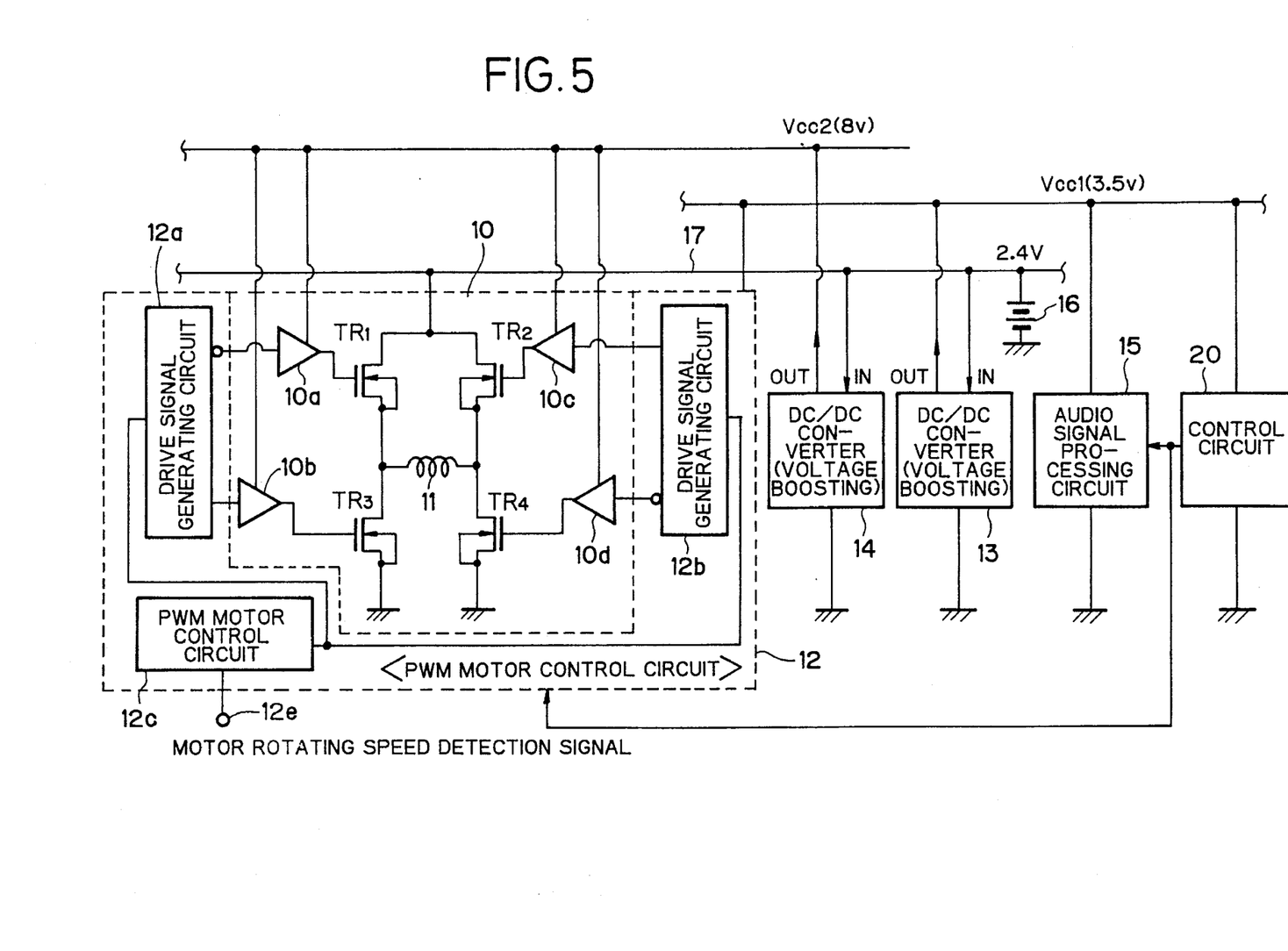
FIG. 5 is a block diagram of a portable audio device primarily a power source circuit thereof including a conventional DC/DC converter.

FIG. 5 is an example of such sorts of DC motor driving circuit, of which output circuit 10 is constituted by four N type MOS transistors TR1, TR2, TR3 and TR4 wherein the output stage transistors are piled up in an H shaped bridge structure. In the bridge portion a DC motor 11 is inserted which is represented in the drawing by the coil portion thereof. Further, in order to drive the output circuit 10 having such structure, a PWM motor control circuit 12 is usually provided.

The PWM motor control circuit 12 is constituted by a PWM control circuit 12c which receives a detection signal corresponding to the rotating speed from the motor 11 at a terminal 12e and produces a PWM control signal for maintaining the rotating speed of the motor 11 constant and two drive signal generating circuits 12a and 12b each of which generates a drive signal of which phase differs from the other by 180°. Further, in order to drive respective transistors in the output stage, the output circuit 10 is provided with drive circuits 10a, 10b, 10c and 10d for driving the respective N type MOS transistors TR1, TR2, TR3 and TR4 upon receipt of the respective outputs from the drive signal generating circuits 12a and 12b.

Further, a portable audio device is provided with an audio signal processing circuit 15, a control circuit 20 including a microcontroller, a ROM and others and a power source circuit including DC/DC converters 13 and 14 and a battery 16 and feeding electric power to the DC motor drive circuit or the output circuit 10, the PWM motor control circuit 12 and the like.

In these circuits, for the first time a power source having an output voltage of 3.5 V is required for the audio signal processing circuit 15. Further, a power source having an output voltage of 2.4 V is required for driving the DC motor 11. Still further, a power source having an output voltage of 8 V is required for the N type MOS transistors TR1 and TR2 located at the upstream side in the output circuit 10. In order to meet these requirements, the DC/DC converter 13 fed from the battery 16 through a DC power source line 17 generates a voltage of 3.5 V and the DC/DC converter 14 fed from the battery 16 generates a voltage of 8 V.

In the motor control, when the motor 11 is required to be rotated in forward direction, for example, the transistor TR4 is turned ON by the output from the drive circuit 10d, the transistor TR2 is turned OFF by the output from the drive circuit 10c and the transistors TR1 and TR3 are controlled by the outputs from the drive circuits 10a and 10b in response to the pulse width of the pulse from the drive signal generating circuit 12a. Contrary thereto, when the motor 11 is required to be rotated in reverse direction, the transistor TR3 is turned ON by the output from the drive circuit 10b, the transistor TR1 is turned OFF by the output from the drive circuit 10a and the ON/OFF of the transistors TR2 and TR4 is controlled by the output of the drive circuits 10c and 10d in response to the pulse width of the pulse from the drive signal generating circuit 12b.

With thus constituted motor driving circuit, although the power consumption for the motor drive can be suppressed, three levels of power source voltages are required such that two of DC/DC converters are necessitated.

On one hand, this sort of portable audio devices is required to reduce the power consumption as much as possible because the devices tend to be driven for a long time with a battery. On the other hand, in view of easy handling of the devices many circuits corresponding to addition of a variety of functions including easy switching operation are required. When many kinds of circuits are formed in one chip by taking into account of the addition of these function circuits, the necessity of the above two DC/DC converters which require a large area on the IC chip is problematic.

SUMMARY OF THE INVENTION

For resolving the above problems, the present assignee filed a Japanese Patent Application No. 5-344375 (1993) which relates to a motor drive circuit for driving a DC motor without necessitating a high voltage power source. In the motor drive circuit the transistors TR1 and TR2 in the upstream side are replaced by bipolar transistors. Thereby, the driving voltage for the transistors is reduced down to 3.5 V and the DC/DC converter 14 generating a power source voltage of 8 V is eliminated.

When this sort of the audio devices is not in the operating condition such as reproducing state, the DC motor is not usually driven except for an exceptional occasion, therefore the power consumption of the devices is comparatively small. In particular, under an operative condition or an operation waiting condition wherein the audio signal processing circuit 15 is inactive and only the control circuit 10 is rendered active the power consumption of the devices is extremely limited. On the other hand, when the DC motor 11 and the audio signal processing circuit 15 are operated, a large amount of electric power is consumed from the battery. When the single DC/DC converter is required to control the conditions from the above heavy load condition to a light load condition such as the above operative condition or the operation waiting condition wherein a slight electric power is consumed such as the control circuit 20 generates a variety of control signals and sets required conditions of the device, for example, when the above control is required to be performed only by the single DC/DC converter 13 (see FIG. 5) as disclosed in the above Japanese Patent Application No. 5-344375 (1993), the single DC/DC converter is designed so as to meet the large power consumption during the heavy load condition.

However, in the circuit suitable for the heavy load condition represented by a large current flow the electric power conversion efficiency is extremely deteriorated under the light load condition represented by a small current flow. Such efficiency deterioration in the battery driven devices leads to a useless electric power consumption which greatly affects the battery life time.

JP-B-5-82146(1993) discloses an SRAM use DC/DC converter for such power source circuit having both heavy load and light load which extremely reduces power consumption during a non-operating or a back-up period. The DC/DC converter makes use of an oscillating circuit using a boosting transformer, and when the DC/DC converter is performing a backing-up of the storage contents in the SRAM, namely during a light load, the oscillation by the boosting transformer is performed intermittently, thereby an improvement of electric power conversion efficiency during a light load period is achieved.

However, in such circuit wherein the boosting transformer is externally mounted, the parts which are to be externally mounted increase with respect to parts on the one chip IC, accordingly during starting and creasing of the oscillation a useless current flows through the circuit. Further, since the circuit performs the same operation as in the heavy load condition under the condition of the oscillating operation and further under the oscillation ceasing condition no operation is performed, ripple components in the circuit increase, so that the circuit is not suitable for the power source circuit for the control circuit including a microcontroller, a ROM and others, and the disclosed circuit can not be used as it is.

Accordingly, one object of the present invention is to provide a DC/DC converter having a desirable electric power conversion efficiency during both a heavy load period and a light load period and having limited ripple components.

Further, another object of the present invention is provide a DC/DC converter suitable for battery driven device which can perform a DC/DC conversion at high efficiency during both a heavy load period and a light load period.

A further object of the present invention is to provide an audio device incorporating a DC/DC converter and a DC motor which can reduce power consumption thereof.

The features of a DC/DC converter according to the present invention which achieves the above objects and which comprises a first load circuit including primarily an electric power output circuit constituting a heavy load for an electric power to be outputted and a second load circuit including primarily a control IC circuit constituting a light load for the electric power to be outputted and connected in parallel with the first load circuit so as to constitute parallel loads, of which DC/DC converter further comprises a switching circuit which includes a transistor for switching a DC power source line and feeds an electrical power to the loads, a switching control circuit which controls the switching period of the transistor so as to maintain an output voltage for the loads at a predetermined constant value and an oscillation circuit which turns ON or OFF the transistor at a predetermined period, wherein when an electric power is fed from the switching circuit to the first load circuit, the switching control circuit is caused to operate, and when an electric power is fed to the second load circuit without feeding to the first load circuit, the operation of the switching control circuit is ceased and the oscillation circuit is caused to operate.

As will be understood from the above, when the circuit is required to be operated under a light load condition the switching and drive of the transistor is directly performed by the output of the oscillation circuit other than the switching control such as PWM through which the conversion efficiency is low under a light load condition. With this measure, the conversion efficiency under a light load condition is improved, the electric power loss encountered as explained above when the boosting transformer is used is reduced and the generation of the ripple is further limited and suppressed. As a result, the power source can feed a suitable electric power for the control circuit including a microcontroller, a ROM and others. Further, under a light load condition the operation at the side of the switching control circuit is ceased, the power consumption thereby is eliminated.

As a result, an efficient power conversion is performed and, in particular, in a battery driven device an operable time of the device per one dry battery is prolonged.

DESCRIPTION OF THE PREFERRED EMBODIMENTS

Figure 1:
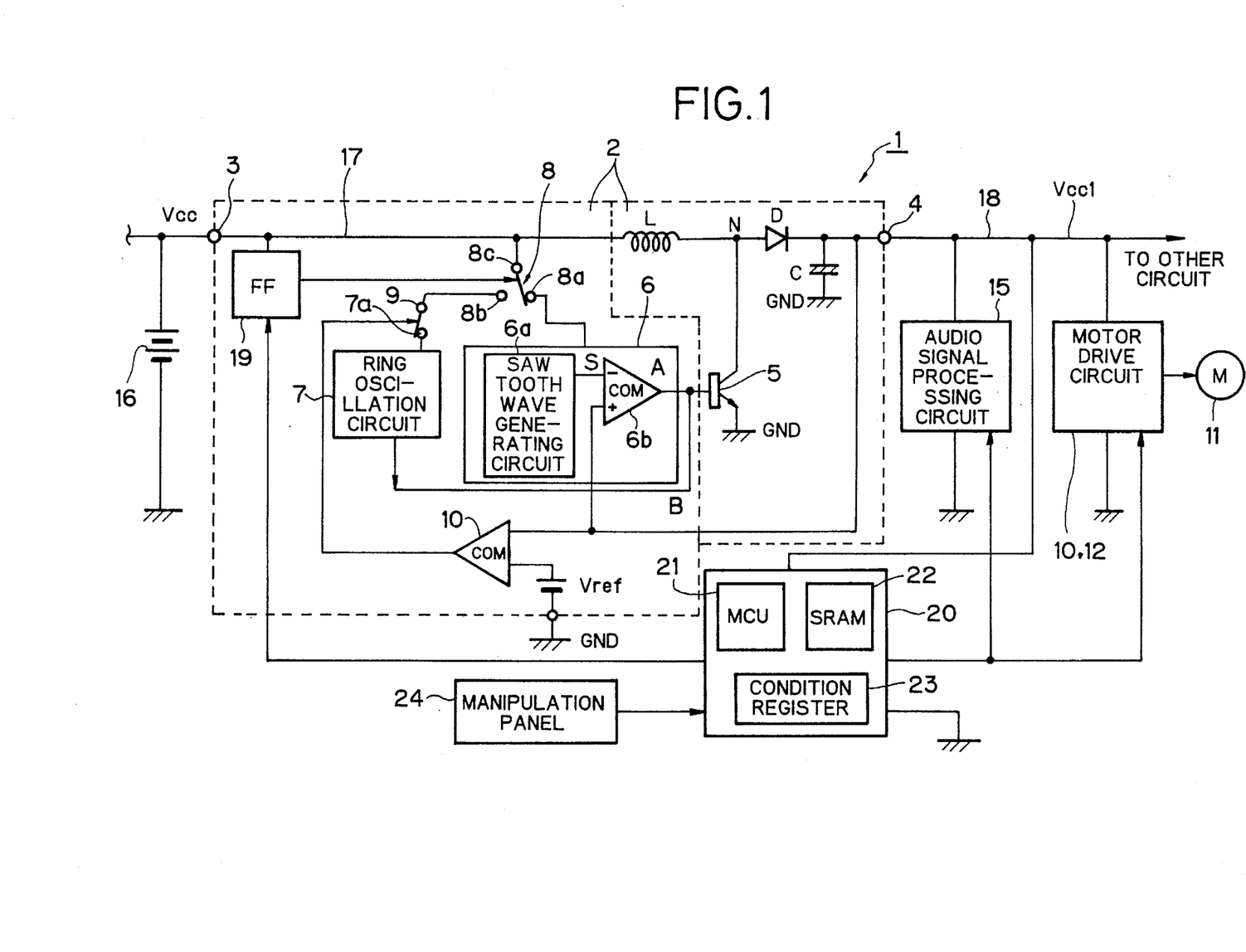
FIG. 1 is a block diagram of one embodiment of portable audio devices primarily the power source circuit thereof to which a DC/DC converter according to the present invention is applied.

In FIG. 1, reference numeral 1 is a portable audio device, 2 is a DC/DC converter circuit therefor, and 3 is an input terminal thereof which is connected to the positive terminal of a battery 16. 4 is an output terminal of the DC/DC converter 2 and is connected to a power source feeding line 18 of 3.5 V. Between the input terminal 3 and the output terminal 4 a DC power source line (VCC) 17, a coil L, a forwardly connected diode D are successively connected in series.

Between a junction N of the coil L and the diode D and ground GND an N type switching transistor 5 is connected in the order of collector and emitter thereof, and at the side of the output terminal 4 a capacitor C is disposed between the output terminal 4 and the ground GND. Further, the elements in FIG. 1 which are the same or equivalent to the elements in FIG. 5 are depicted by the same reference numerals as in FIG. 5 and the explanation thereof is omitted.

Figure 2A:
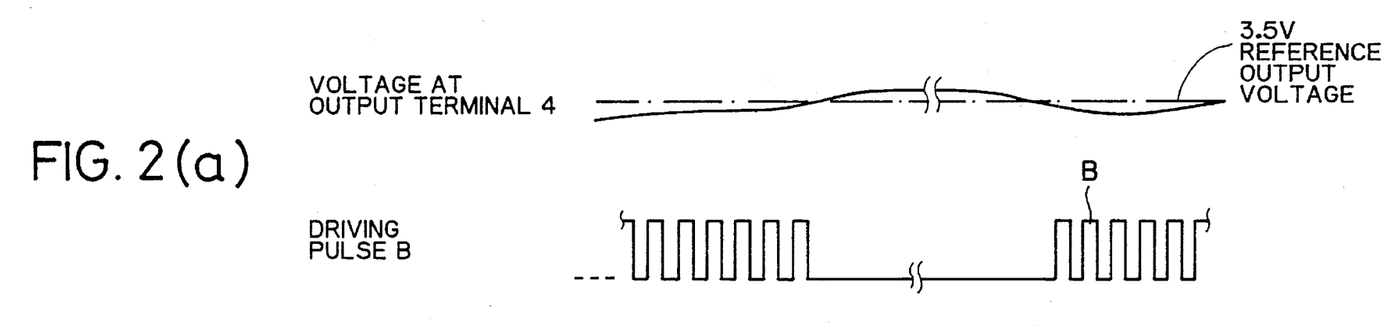
FIG. 2(a) is a view for explaining a voltage control waveform of the embodiment under a light load condition.
Figure 2B:
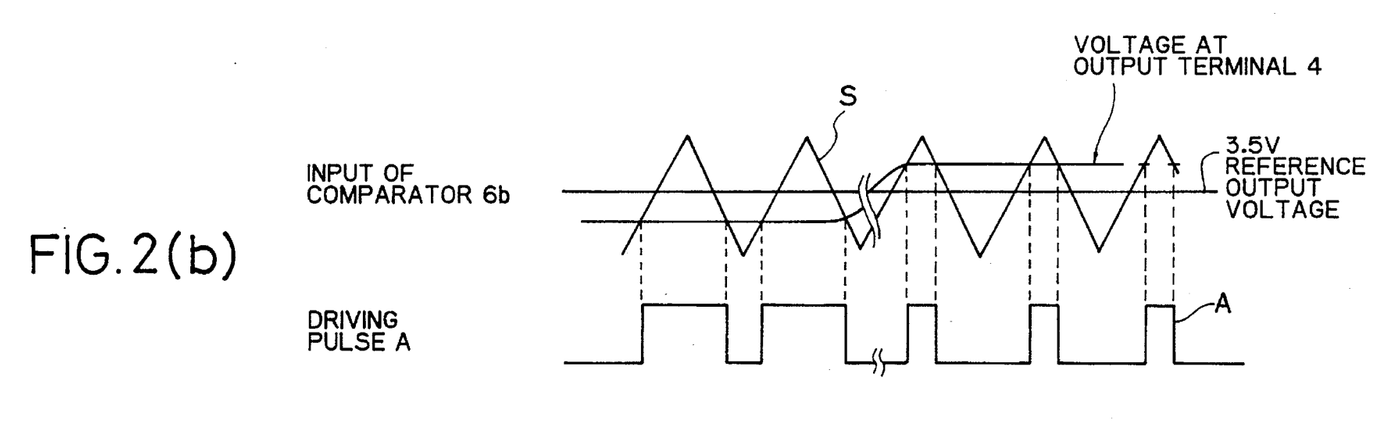
FIG. 2(b) is a view for explaining a voltage control waveform of the embodiment under a heavy load condition.

The base of the transistor 5 is connected to the output of a PWM control circuit 6 and the transistor 5 is turned ON/OFF by the output. The PWM control circuit 6 includes a saw tooth wave generating circuit 6a and a comparator 6b, and the saw tooth wave generating circuit 6a generates a saw tooth wave S as illustrated in FIG. 2(b) oscillating upward and downward using the reference output voltage (herein 3.5 V) generated at the output terminal 4 as the reference level. The comparator 6b compares the voltages of the saw tooth wave S and at the output terminal 4, sends out to the transistor 5 a driving pulse A having a pulse width corresponding to the comparison result and turns ON/OFF the transistor 5. Thereby the transistor 5 is turned ON/OFF so that the output voltage is maintained at the reference voltage, in other words a so called PWM switching regulation control is performed.

Reference numeral 7 is a ring oscillation circuit of semiconductor oscillation circuit and is constituted by a shift registor of which input stage and output stage are connected. The ring oscillation circuit 7 is a so called ring counter in which input stage one bit is set as the initial value, the thus set one bit is successively shifted in response to a clock produced inside or a clock from the outside, and one bit output is generated at the output stage with a predetermined period as a driving pulse B. The output is fed to the base of the transistor 5 and turns ON/OFF the same.

The period and width of the driving pulse B generated by the ring oscillation circuit 7 is selected in such a manner that the power consumption thereby is slightly larger than the average power consumed by the control circuit 20 at the reference voltage under a light load condition. Accordingly, when the ring oscillation circuit 7 is operated, the voltage at the output terminal 4 shows the reference voltage (=3.5 V) or slightly higher voltage than the reference voltage.

Further, the light load condition represents a condition wherein the control circuit 20 and the associating surrounding circuits are activated, however the device has not yet reached a condition to permit driving of the DC motor because of such as at the power source making moment and the actuation initiating moment, namely the condition has never reached to the reproduction or the fast forwarding operation, and no transfer of the disk or tape has not yet started. Such condition is detected by the control circuit 20 of which is explained later.

Reference numeral 8 is a change-over circuit and a terminal 8c at the input side is normally connected to a terminal 8a at the output side and the electric power from the power source line 17 is fed to the PWM control circuit 6 via the terminals 8c and 8a. When the output of a flip-flop 19 is "1", the connection of the terminal 8c is changed over to the side of an output terminal 8b and the electric power from the power source line 17 is fed to the side of the ring oscillation circuit 7 via the terminals 8c and 8b, thus the operation of the PWM control circuit 6 is ceased.

A switch circuit 9 is a circuit inserted between the output terminal 8b of the change-over circuit 8 at the side of the ring oscillation circuit 7 and the power source terminal 7a of the ring oscillation circuit 7 and is turned ON/OFF in response to control signals from a comparator (COM) 10. The comparator 10 compares the voltage at the output terminal 4 with a comparison reference level Vref and turns ON the switch circuit 9 when the voltage at the output terminal 4 drops below the comparison reference level and otherwise turns OFF the same. The comparison reference level Vref coincides with the above mentioned reference voltage (=3.5 V).

Accordingly, even under a light load condition when the voltage at the output terminal 4 is slightly higher than the reference output voltage, no electric power is fed to the ring oscillation circuit 7, so that the ring oscillation circuit 7 remains inactive. Under such condition, when an electric power is fed from the output terminal 4 to the control circuit 20 and the voltage at the output terminal 4 drops more or less below the reference voltage, the switch circuit 9 turns ON and the ring oscillation circuit 7 is activated. As a result, a driving pulse B of a short pulse width having a predetermined period as illustrated in FIG. 2(a) is generated and the electric power feeding is continued until the voltage at the output terminal 4 reaches to a slightly higher value than the reference output voltage. When the voltage at the output terminal 4 has reached to a value slightly higher than the reference output voltage, the switch circuit 9 is turned OFF. Thereby, the generation of the driving pulse B is ceased. As a result of repetition of such control, the voltage at the output terminal 4 is maintained at a value substantially equal to or slightly higher than the reference output voltage.

Under a heavy load, when the voltage at the output terminal 4 drops below the reference output voltage as illustrated in FIG. 2(b), the voltage of the output terminal 4 lowers below the reference level of the saw tooth wave amplitude, thereby, the pulse width of the driving pulse A is increased and the ON period of the switching transistor 5 is prolonged. As a result, current which is fed to the load increases and the voltage at the output terminal 4 restores up to the reference voltage.

When the voltage at the output terminal 4 rises above the reference output voltage, the voltage terminal 4 rises above the reference level of the saw tooth wave amplitude, thereby the pulse width of the driving pulse A decreases and the ON period of the switching transistor 5 is shortened. As a result, current which is fed to the load decreases and the voltage at the output terminal 4 restores up to the reference voltage.

Since the ON/OFF control of the transistor 5 by the output of the ring oscillation circuit 7 is performed simply by shifting bit data set at the shift register in response to clocks, the power consumption required for such drive is less than that required in the circuit using the saw tooth wave oscillation circuit 6a and the comparator 6b and the power conversion efficiency of the former is higher than that of the later.

The control circuit 20 is constituted by a microcontroller (MCU) 21, a ROM (in the present embodiment SRAM) 22, a conduction register 23 and others. The condition register 23 is a register which, when the heavy load circuit is activated, stores data (condition data) in which a flag at the position corresponding to the circuit is set at "1". The flag set and reset operation of the respective digit positions in the condition register 23 is performed by the MCU 21.

For example, when assuming that the condition data stored in the condition register 23 is 4 bits and when the device is set at the reproducing condition, the bit at A0 digit position is, for example, set at "1". Further, when the DC motor is driven, the bit at A1 digit position is set at "1".

Thus, under a reproducing and motor driving condition the data gives "0011". In the like manner, when another heavy load circuit is in a condition to be activated, the bit at a remaining digit position is allocated therefor and when the circuit rendered in an active condition, the corresponding bit is set at "1" and when the activation thereof is ceased the bit at the corresponding digit position is set at "0".

Further, the setting of the data at specific bits is performed by the MCU 21 which receives a manipulation signal from the manipulation panel 24 and executes a predetermined arithmec processing and logical operation in response to the command from the manipulation signal. Such setting is also performed when a starting condition for driving such as the DC motor is generated based on a judgement processing or an operation starting condition of the audio signal processing circuit 15 including a power amplifier is generated. Accordingly, a resetting of a specific bit relating to a previous condition data is performed when the above condition does not hold any more.

Figure 3:
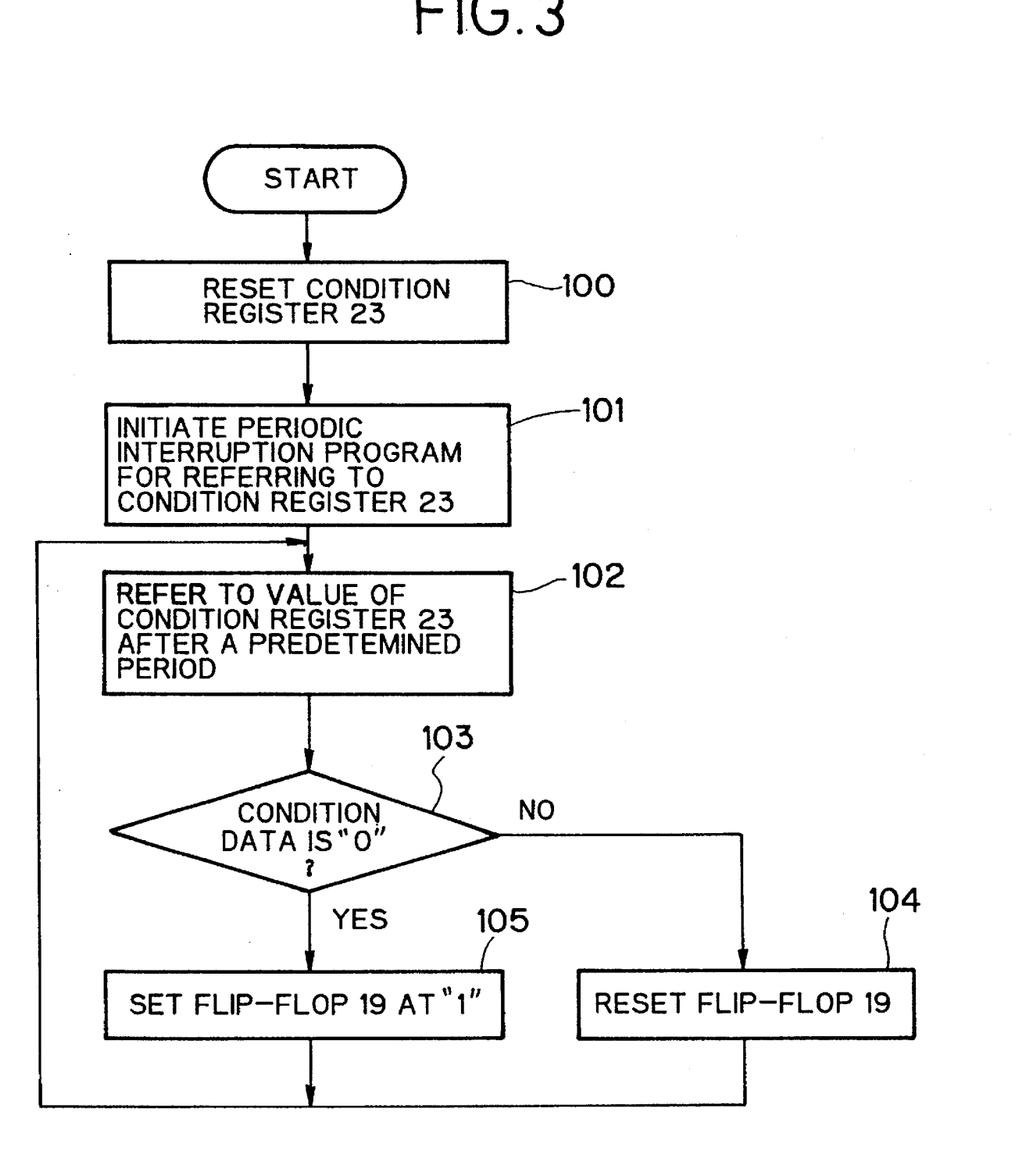
FIG. 3 is a flow chart of processings performed in the control circuit for setting a light load condition.

An example of setting controls of a light load condition in the control circuit 20 is explained with reference to the flow chart in FIG. 3. For the first time, at the time after the power source is made, the condition register 23 is reset (at step 100). A periodic interruption program is initiated which causes to periodically refer to the value of the condition register 23 (at step 101). After a predetermined period has passed from the interruption by the program, the condition register 23 is referred to (at step 102). Then, it is judged whether or not the value of the condition register is "0" ( at step 103 ). When the judgement is NO, the flip-flop 19 is reset (at step 104), the process returns to step 102 and the reference operation is stopped until the subsequent interrupting operation is initiated. As a result of the above operation, the PWM control circuit 6 is operated.

When the judgement at step 103 is YES, namely, any of the digits in the condition data is not "1", the flip-flop 19 is set at "1" (step 105), the process returns to step 102 and the reference operation is stopped until the subsequent interrupting operation is initiated. When the flip-flop 19 is set at "1" as explained above, an electric power is fed to the side of the ring oscillation circuit 7.

Further, the judgement processing in the step 104 can be performed by a predetermined arithmetic processing and logical operation other than the program. When the judgement processing is performed through a predetermined arithmetic processing and logical operation, the MCU 21 can be constituted by an gate array including an arithmetic circuit.

Through these processings, for example, when the starting condition permitting driving of such as the DC motor is generated or the operation initiating condition of the audio signal processing circuit 15 is generated, the flip-flop 19 is reset to render the data "0" so as to stop the output of the flip-flop 19, and an electric power is fed to the PWM control circuit 6 via the side of the output terminal 8a. Further, contrary thereabove, when the motor is brought into a stand still condition, the flip-flop 19 is set at "1", and an electric power is fed to the side of the ring oscillation circuit 7.

When such a circuit is used in which if the motor 11 is driven, the audio signal processing circuit 15 is always operated, the flip-flop 19 can be reset at "0" in response to the generation of a motor drive signal and the flip-flop 19 can be set at "1" in response to a motor drive stopping signal, thereby the above explained condition register 23 can be eliminated.

Now, when the flip-flop 19 is designed to be set at "1" under the initial condition when the power source is made, the ring oscillation circuit 7 can be operated with priority at the time when the power source for the device is made. In this instance, the electric power for the flip-flop 19 is designed to be fed from the power source line 17 as illustrated. When the flip-flop 19 is set at "0" under an initial condition or in an indefinite condition, the PWM control circuit 6, of course, operates at the time when the power source is made, and thereafter either the ring oscillation circuit 7 or the PWM control circuit 6 is operated depending on the load condition.

An overall operation of the DC/DC converter 2 is explained hereinbelow. A condition, when a circuit operation initiating condition for a heavy load is not held such as when the DC motor and the like are not driven or when the audio signal processing circuit 15 is not actived, is a so called light load operating condition. Under such condition, according to the processings in FIG. 3, the flip-flop 19 is set at "1", the change-over circuit 8 is changed over to the side of the ring oscillation circuit 7 and a condition is reached wherein an electric power from the power source line 17 is fed to the ring oscillation circuit 7. As a result, the switching control of the transistor 5 is performed by the ring oscillation circuit 7 in response to the output of the comparator 10 so that the voltage at the output terminal 4 is maintained substantially at the reference voltage. Thus, the electric power at this moment is fed to light load circuits such as the control circuit 20 and no electric power is fed to the PWM control circuit 6, thereby the PWM control circuit 6 is maintained inoperative.

On the other hand, under a heavy load condition such as when the DC motor is driven such as during reproduction and fast forwading operation, or when only the audio signal processing circuit is operated such as during reception of radio broadcast and a power amplification is performed in a voice sound output circuit, the flip-flop 19 is reset, thereby the change-over circuit 8 is changed over toward the side of the PWM control circuit 0 and an electric power from the power source line 17 is fed to the side of the PWM control circuit 6. As a result, the transistor 5 is so called PWM switching controlled by the PWM control circuit 6 so that the voltage at the output terminal 4 is maintained at the reference voltage. At this moment, the operation of the ring oscillation circuit 7 is stopped.

Figure 4:
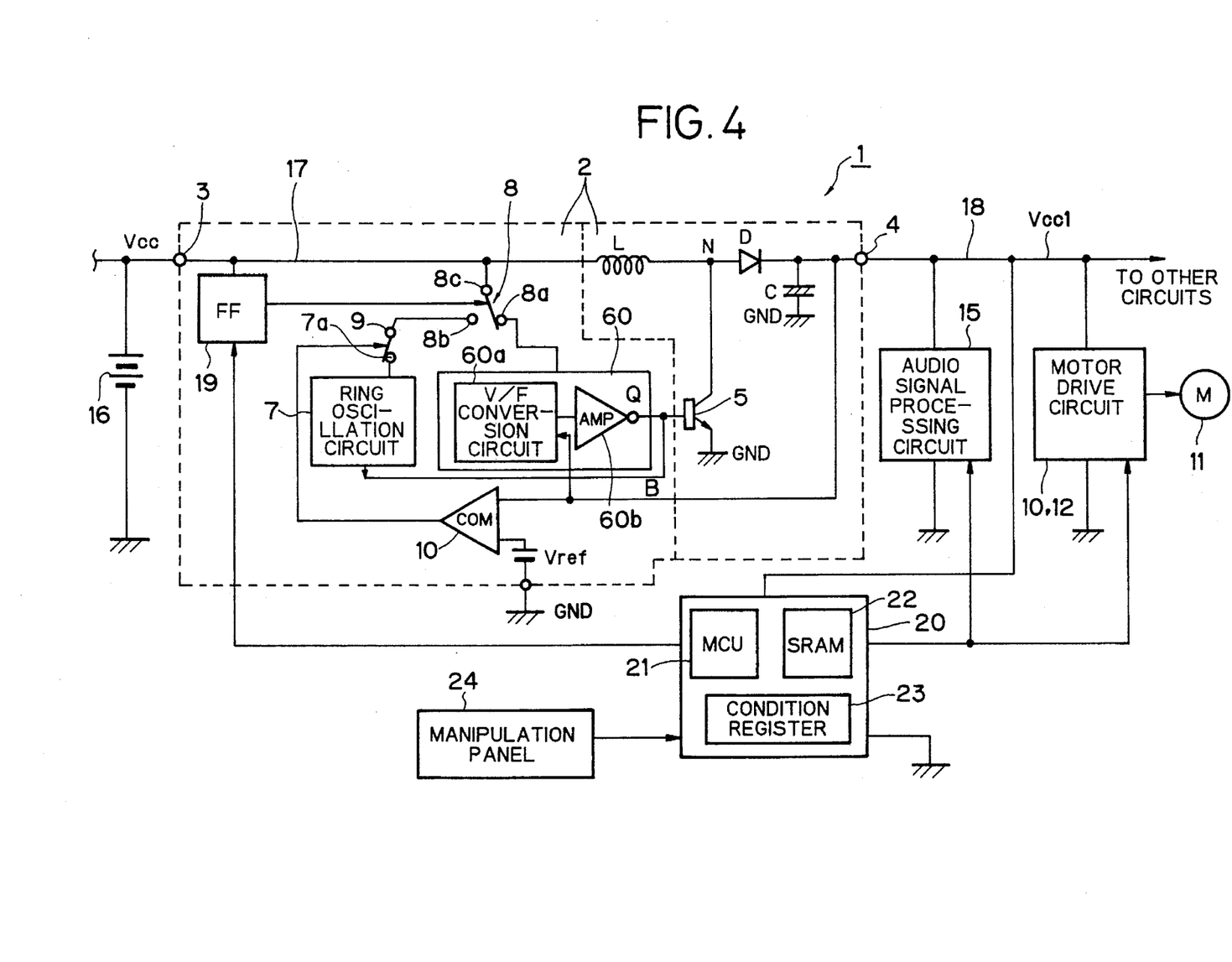
FIG. 4 is a block diagram of one embodiment of frequency control circuits to which a DC/DC converter according to the present invention is applied.

FIG. 4 shows another control circuit in which the switching control is performed by a frequency control in place of the PWM control and the PWM control circuit 6 is replaced by a frequency control circuit 60.

The frequency control circuit 60 is constituted by a V/F conversion circuit 60a and an inverted amplifier 60b. The V/F conversion circuit 60a generates a driving pulse Q of a lower frequency than a reference frequency and having a constant pulse width when the input voltage is higher than a reference voltage, and when the input voltage is lower than the reference voltage, generates a driving pulse Q of a higher frequency than the reference frequency and having the constant pulse width. The other operations of the circuit are substantially the same as of the previous embodiment, the explanation thereof is omitted.

In the embodiments as explained hereinabove, with the provision of the flip-flop the switching control circuit is switched, the switching control circuit can be directly switched by the control signal from the control circuit 20 without providing the flip-flop. Further, in the above embodiments, when the flip-flop is set at "1", the side of the ring oscillation circuit is operated and when the flip-flop is set at "0", the side of the PWM control circuit is operated, however such relation can be reversed.

Further, the comparator 10 in the embodiments is a detecting circuit for detecting whether the voltage at the output terminal 4 drops below the comparison reference level, however, the detection circuit can be designed to turn OFF the switch circuit 9 when the voltage at the output terminal 4 rises more than the comparison reference level. Still further, the detection voltage of the detection circuit can be set at a lower value than the reference voltage if the set voltage is within the range of the operating voltage of the light load circuit.

We claim:

1. A DC/DC converter comprising:
   a first load circuit including primarily an electric power output circuit constituting a heavy load for an electric power to be outputted;
   a second load circuit including primarily a control IC circuit constituting a light load for the electric power to be outputted and connected in parallel with said first load circuit so as to constitute parallel loads;
   a switching circuit which includes a transistor for switching a DC power source line and feeds an electric power to said loads,
   a switching control circuit which controls the switching period of the transistor so as to maintain an output voltage for the loads at a predetermined constant value; and,
   an oscillation circuit which turns ON or OFF the transistor at a predetermined period, wherein when an electric power is fed from said switching circuit to said first load circuit, said switching control circuit is caused to operate, and when an electric power is fed to said second load circuit without feeding to said first load circuit, the operation of said switching control circuit is ceased and said oscillation circuit is caused to operate.

2. A DC/DC converter according to claim 1, wherein said electric power output circuit is a driving circuit for a DC motor, said second load circuit is a microcontroller formed in an IC, said switching control circuit is for turning ON/OFF of the transistor via a PWM control and said power source line is fed of the electric power from a battery.

3. A DC/DC converter according to claim 2, further comprising:
   a selection circuit which causes to operate said oscillation circuit when no electric power is fed to said first load circuit and an electric power is fed to said second load circuit in response to a control signal of said microcontroller and further causes to operate said switching control circuit when an electric power is fed both said first and second load circuits in response to a control signal of said microcontroller; and a detection circuit which detects either the voltage at the output side for the loads is more than a predetermined voltage value or is less than the predetermined voltage value, wherein the operation of said oscillation circuit is controlled in response to a detection signal of said detection circuit so that the voltage at the output side for the load is maintained at the predetermined voltage value.

4. A DC/DC converter according to claim 3, wherein said switching circuit includes a series circuit constituted by a coil and a diode of forward connection and connected between the power source line and said loads, a capacitor connected between the cathode side of the diode and ground and said transistor connected between the anode side of the diode and the ground.

5. A DC/DC converter according to claim 4, wherein said first load circuit includes an audio output circuit, said oscillation circuit is a semiconductor oscillation circuit, said detection circuit is a comparator which compares the voltage at the output side for the loads with the predetermined value, said selection circuit is a change-over circuit which selectively feeds an electric power from the power source line either to said switching control circuit or to said oscillation circuit in response to a control signal from said second load circuit.

6. A DC/DC converter according to claim 5, wherein said semiconductor oscillation circuit is a ring oscillation circuit, said control signal sets at a flip-flop one of logical conditions of "1" and "0", said change-over circuit is a switch circuit which changes over the connection in response to the output of either "1" or "0" of said flip-flop, between said switch circuit and said ring oscillation circuit another switch circuit is provided which is turned ON/OFF in response to the output of said comparator, and said flip-flop is set at a predetermined logical condition wherein under the starting condition when the power source is made said change-over circuit is connected to the side feeding an electric power to said ring oscillation circuit.

7. An audio device comprising:
   a first load circuit including a DC motor driving circuit, a DC motor adapted to be driven by said DC motor driving circuit and an audio output circuit;
   a second load circuit including primarily a control IC circuit which generates a variety of control signals to the audio device;
   a battery; and,
   a DC/DC converter including a switching circuit having a transistor for switching a power source line connected to said battery and feeds an electrical power to the loads; a switching control circuit which controls the switching period of said transistor so as to maintain an output voltage for the loads at a predetermined constant value; and an oscillation circuit which turns ON or OFF said transistor at a predetermined period, wherein when an electric power is fed from said switching circuit to said first load circuit said switching control circuit is caused to operate, and when an electric power is fed to said second load circuit without feeding to said first load circuit, the operation of said switching control circuit is ceased and said oscillation circuit is caused to operate.

8. An audio device according to claim 7, wherein said second load circuit is an IC circuit which generates control signals for respective circuits in the audio device and said DC/DC converter further includes a selection circuit which causes to operate said oscillation circuit when no electric power is fed to said first load circuit and an electric power is fed to said second load circuit in response to a control signal of said IC circuit and further causes to operate said switching control circuit when an electric power is fed both said first and second load circuits in response to a control signal of said IC circuit, and a dection circuit which detects either the voltage at the output side for the loads is more than a predetermined voltage value or is less than the predetermined voltage value, wherein the operation of said oscillation circuit is controlled in response to a detection signal of said detection circuit so that voltage at the output side for the load is maintained at the predetermined voltage value.

* * * * *